(12) United States Patent
Chau et al.

(10) Patent No.: US 8,927,078 B2
(45) Date of Patent: Jan. 6, 2015

(54) ENCAPSULATED ACTIVATED CARBON AND THE PREPARATION THEREOF

(75) Inventors: Chieh-Chun Chau, Victor, NY (US); William F. Patchen, Farmington, NY (US)

(73) Assignee: Reynolds Consumer Products Inc., Lake Forest, IL (US)

( * ) Notice: Subject to any disclaimer, the term of this patent is extended or adjusted under 35 U.S.C. 154(b) by 223 days.

(21) Appl. No.: 13/396,248

(22) Filed: Feb. 14, 2012

(65) Prior Publication Data
US 2012/0145008 A1 Jun. 14, 2012

Related U.S. Application Data

(63) Continuation of application No. 11/957,102, filed on Dec. 14, 2007, now abandoned.

(51) Int. Cl.
B29D 22/00 (2006.01)
B32B 27/18 (2006.01)
C08J 3/22 (2006.01)

(52) U.S. Cl.
CPC .......................................... C08J 3/22 (2013.01)
USPC ....... 428/36.5; 428/35.2; 428/35.4; 428/35.5; 428/35.7; 428/36.6; 428/36.7; 428/144; 428/155; 428/168; 428/206; 428/307.3; 428/316.6; 428/323; 428/402; 428/403; 428/407; 264/134; 264/177.2; 264/210.6; 264/211; 383/105; 206/524.3; 206/524.4; 524/425; 524/495; 524/496; 96/153

(58) Field of Classification Search
None
See application file for complete search history.

(56) References Cited

U.S. PATENT DOCUMENTS

| | | |
|---|---|---|
| 3,386,851 A | 6/1968 | Harlan |
| 3,992,558 A | 11/1976 | Smith-Johannsen et al. |
| 4,265,960 A | 5/1981 | Arbit et al. |
| 4,476,169 A | 10/1984 | Nishino et al. |
| 4,732,805 A | 3/1988 | Maggs |
| 4,797,318 A | 1/1989 | Brooker et al. |
| 4,861,632 A | 8/1989 | Caggiano |
| 5,004,647 A | 4/1991 | Shah |
| 5,015,521 A | 5/1991 | Fujii et al. |
| 5,116,660 A | 5/1992 | Komatsu et al. |
| 5,129,735 A | 7/1992 | Neal et al. |
| 5,290,613 A | 3/1994 | Shuetz et al. |
| 5,324,348 A | 6/1994 | Perret, Jr. et al. |
| 5,389,346 A | 2/1995 | Copeland, Jr. |

(Continued)

FOREIGN PATENT DOCUMENTS

| | | |
|---|---|---|
| EP | 1131259 | 9/2001 |
| GB | 1466702 A | 3/1977 |
| WO | WO 00/29311 | 5/2000 |

OTHER PUBLICATIONS

U.S. Appl. No. 11/957,102 (Abandoned), filed Dec. 14, 2007.

(Continued)

*Primary Examiner* — Jeffrey Wollschlager
(74) *Attorney, Agent, or Firm* — Baker Botts LLP

(57) ABSTRACT

The present invention relates to encapsulated activated carbon and a method of preparing the same to protect the structure of the activated carbon and preserve the odor absorbing capability of the activated carbon particles. Particularly, the present invention is directed to a polymer article having odor absorption capabilities comprising a film comprising a matrix polymer and activated carbon particles at least partially encapsulated with a non-water soluble amorphous polymer, wherein the non-water soluble amorphous polymer is incompatible with the matrix polymer. The polymer article can be a bag.

22 Claims, 4 Drawing Sheets

(56) References Cited

U.S. PATENT DOCUMENTS

| | | |
|---|---|---|
| 5,482,773 A | 1/1996 | Bair |
| 5,540,916 A | 7/1996 | Parks |
| 5,582,820 A | 12/1996 | Yamamoto et al. |
| 5,591,146 A | 1/1997 | Hasse |
| 5,865,926 A | 2/1999 | Wu et al. |
| 5,889,093 A | 3/1999 | Hatakeyama et al. |
| 6,077,588 A | 6/2000 | Koslow et al. |
| 6,391,429 B1 | 5/2002 | Senkus et al. |
| 6,395,522 B1 | 5/2002 | DeFilippi et al. |
| 6,429,165 B1 | 8/2002 | Nastke et al. |
| 6,458,458 B1 | 10/2002 | Cooke et al. |
| 6,479,571 B1 | 11/2002 | Cooke et al. |
| 6,503,587 B2 | 1/2003 | Kashiba et al. |
| 6,620,474 B1 | 9/2003 | Regnier et al. |
| 6,639,004 B2 | 10/2003 | Falat et al. |
| 6,692,823 B2 | 2/2004 | Kody et al. |
| 6,740,406 B2 | 5/2004 | Hu et al. |
| 6,890,373 B2 | 5/2005 | Nemoto et al. |
| 7,148,285 B2 | 12/2006 | Clark et al. |
| 7,247,374 B2 | 7/2007 | Haggquist |
| 7,312,167 B2 | 12/2007 | McCormack et al. |
| 7,325,383 B2 | 2/2008 | Matsunaga et al. |
| 7,597,838 B2 | 10/2009 | Subramanian et al. |
| 7,887,894 B2 | 2/2011 | Chiba et al. |
| 8,092,877 B2 | 1/2012 | Jester et al. |
| 2003/0078552 A1 | 4/2003 | Tepper et al. |
| 2003/0087086 A1 | 5/2003 | Koslow et al. |
| 2004/0137202 A1 | 7/2004 | Hamilton et al. |
| 2005/0085577 A1 | 4/2005 | Ching et al. |
| 2005/0123763 A1 | 6/2005 | Hiltzik et al. |
| 2006/0008646 A1 | 1/2006 | Haggquist |
| 2006/0142712 A1 | 6/2006 | Quincy |
| 2007/0122609 A1 | 5/2007 | Hiltzik et al. |
| 2007/0237916 A1 | 10/2007 | Rasmussen et al. |
| 2008/0009560 A1 | 1/2008 | McKay, Jr. |
| 2009/0004433 A1 | 1/2009 | Privitera et al. |
| 2009/0155508 A1 | 6/2009 | Chau et al. |

OTHER PUBLICATIONS

U.S. Appl. No. 11/957,102, May 10, 2012 Notice of Abandonment.
U.S. Appl. No. 11/957,102, Jan. 25, 2012 Advisory Action.
U.S. Appl. No. 11/957,102, Nov. 11, 2012 Response to Final Office Action.
U.S. Appl. No. 11/957,102, Dec. 30, 2011 Advisory Action.
U.S. Appl. No. 11/957,102, Dec. 14, 2011 Response to Final Office Action.
U.S. Appl. No. 11/957,102, Oct. 14, 2011 Final Office Action.
U.S. Appl. No. 11/957,102, Sep. 23, 2011 Response to Non-Final Office Action.
U.S. Appl. No. 11/957,102, Jun. 3, 2011 Non-Final Office Action.
U.S. Appl. No. 11/957,102, May 4, 2011 Request for Continued Examination (RCE).
U.S. Appl. No. 11/957,102, Apr. 18, 2011 Advisory Action.
U.S. Appl. No. 11/957,102, Apr. 7, 2011 Response to Final Office Action.
U.S. Appl. No. 11/957,102, Mar. 23, 2011 Advisory Action.
U.S. Appl. No. 11/957,102, Mar. 7, 2011 Response to Final Office Action.
U.S. Appl. No. 11/957,102, Jan. 7, 2011 Final Office Action.
U.S. Appl. No. 11/957,102, Nov. 2, 2010 Response to Non-Final Office Action.
U.S. Appl. No. 11/957,102, Aug. 2, 2010 Non-Final Office Action.

ENCAPSULATED ACTIVATED CARBON AND THE PREPARATION THEREOF

RELATED APPLICATIONS

This application is a continuation of U.S. application Ser. No. 11/957,102, filed Dec. 14, 2007 now abandoned, the contents of which are incorporated herein by reference in its entirety.

BACKGROUND OF THE INVENTION

1. Field of the Invention

The present invention relates to encapsulated activated carbon and a method of preparing the same to protect the structure of the activated carbon and preserve the odor absorbing capability of the activated carbon particles. Particularly, the present invention is directed to a polymer substrate and a method of forming the same upon melt processing using activated carbon particles encapsulated with a non-water soluble amorphous polymer.

2. Description of Related Art

Garbage waste is often a source of odor in a household. For example, odor can be generated from waste during storage in a trash container or waiting for disposal in a garbage bag. Odor from waste can be a nuisance and a variety of methods and products are known for managing the odor. For example, one known technique uses a scented formula to mask the odor. Such conventional methods and systems generally have been considered satisfactory for their intended purpose, although there remains a need for addressing malodors without the resulting scented affect.

Therefore, a method of managing odor generation remains highly desirable for home waste management. It is also desirable that the odor from the household waste be reduced with a simple and cost effective method.

Activated carbon is known for odor absorption due to its highly porous nature and has been used in a variety of other industries for years for various odor control applications. For example, activated carbon has been used in filtration blocks, filter packages and others. Activated carbon has been recognized as an excellent candidate for odor reduction in certain applications involving porous or textile materials because of its known odor absorption capability and relatively low cost and availability.

However, when activated carbon is blended with a molten polymer, the porosity is reduced due to penetration of polymer molecules in the activated carbon. As a result, the odor absorbing capability of the activated carbon is reduced as compared to the original powdery state. This constitutes a potential performance issue for activated carbon or any odor additives embedded in a bag structure where quick odor absorption is desirable. Therefore a method is needed to preserve and facilitate the odor absorbing capability of the activated carbon in melt processing.

As described in U.S. Pat. Nos. 3,992,558 and 4,265,960, encapsulation of particles is known for dispersion purposes. The process is well developed and open to practice. U.S. Patent Publication 2006/0,008,646 describes coating activated carbon with a removable or leachable material for wet processing. As evident from this related art, this processing requires a washing removal step that necessitates disposal of the waste wash, additional labor, and increased hygiene. While this process may be suitable for the textile industry, it is not applicable to polymer products or industries that utilize a melt processing process.

Thus there remains a need for an efficient and economic method and system for protecting the structure of the activated carbon and preserving the odor absorbing capability of the activated carbon particles upon melt processing.

SUMMARY OF THE INVENTION

The purpose and advantages of the present invention will be set forth in and apparent from the description that follows, as well as will be learned by practice of the invention. Additional advantages of the invention will be realized and attained by the methods and compositions particularly pointed out in the written description and claims hereof, as well as from the appended drawings.

To achieve these and other advantages and in accordance with the purpose of the invention, as embodied and broadly described, the invention includes a method of forming a polymer substrate upon melt processing. The method includes providing a first master batch of activated carbon particles which are encapsulated with a non-water soluble amorphous polymer, providing a matrix polymer, mixing the first master batch with the matrix polymer to form a mixture, and extruding the mixture to form a polymer substrate. The method can also include forming microvoids or cavitations around the activated carbon particles after extrusion.

Melt processing is any of a variety of well known dry processes and has many suitable applications including, but not limited to, blown film (bag bubble), cast film (flat sheet), melt spinning fiber, extrusion of solid rod or three-dimensional objects (crown molding for building construction), injection molding, thermoforming, and the other suitable applications. One of ordinary skill in the art could apply the description herein for use in any of these and other suitable applications.

In one exemplary embodiment, the non-water soluble amorphous polymer is incompatible with the matrix polymer. In a preferred embodiment, the matrix polymer is linear low density polyethylene ("LLDPE"). A preferred non-water soluble amorphous polymer is polystyrene. In one embodiment, the method also includes adding at least one additive to the master batch, such as $CaCO_3$. The activated carbon particles are non-modified activated carbon particles.

The invention also includes a polymer substrate. The polymer substrate comprises a matrix polymer substrate material, activated carbon particles, and a non-water soluble amorphous polymer which at least partially encapsulates the activated carbon particles.

In a preferred embodiment, the polymer substrate is a film with a thickness between 0.5 and 10 mils. The polymer substrate can be a single layer or can include two or more layers. In one embodiment, a first layer of a multi-layer structure includes the activated carbon particles. The loading of activated carbon is substantially between 0.1 and 50 wt %, preferably between 0.2 and 20 wt %, and more preferably between 0.5 and 10 wt %. The invention also includes a bag made from the polymer substrate. If multi-layer, the first layer having the activated carbon therein is located on the inside of the bag.

The invention also includes a master batch for use in melt processing to prepare a polymer substrate. The master batch comprises a matrix polymer substrate material, activated carbon particles, and a non-water soluble amorphous polymer which at least partially encapsulates the activated carbon particles. The master batch also can include portions of a matrix polymer substrate material.

A preferred non-water soluble amorphous polymer is a rigid, permeable polymer, such as polystyrene. Preferably, the non-water soluble amorphous polymer is a brittle composition that can be cracked. The activated carbon particles have an average particle size of 10 microns or less.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and compositions of the invention. Together with the description, the drawings serve to explain the principles of the invention.

DETAILED DESCRIPTION OF THE PREFERRED EMBODIMENT

Reference will now be made in detail to the present preferred embodiments of the invention, examples of which are illustrated in the accompanying drawings. The method and corresponding steps of the invention will be described in conjunction with the detailed description of the invention.

Figure 1:
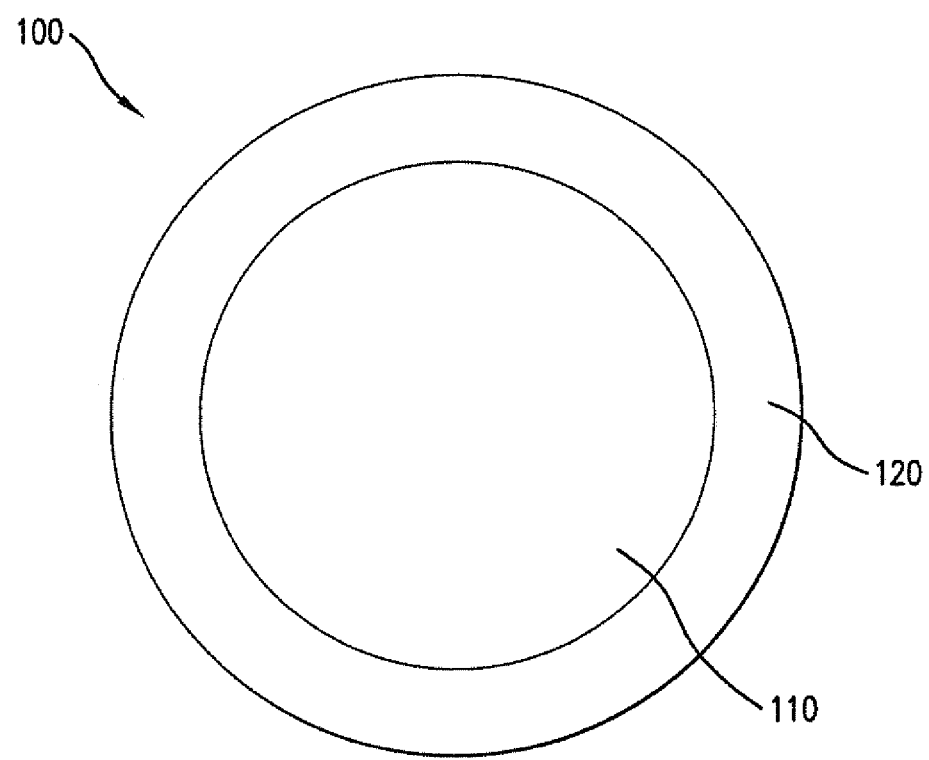
FIG. 1 is a representation of the encapsulated activated carbon in accordance with the invention.

The methods and compositions presented herein generally are intended for melt processing, although other similar or suitable polymer processing is contemplated. The present invention is particularly suited for the preparation of encapsulated activated carbon to protect the structure of the activated carbon and preserve the odor absorbing capability of the activated carbon particles upon melt processing. For purpose of explanation and illustration, and not limitation, an exemplary embodiment of the encapsulated activated carbon in accordance with the invention is shown in FIG. 1 and is designated generally by reference character 100.

The invention is particularly useful to incorporate activated carbon with a polymer into a polymer substrate. The activated carbon master batch can be used when extruding shaped articles, films or sheets to provide quick or short time odor absorbing efficacy. The invention may be used for liners, sheets, storage bags, sachets, patches, shoe insoles, and other suitable applications; all used anywhere odor protection or control is desired. This invention allows the use of activated carbon in extrusion, coating, and molding techniques. Final products include sheets, rods, films, and rolls. The rod or sheets can be cut into sections or the sheets can be wound on a roll. For blown film application, a blown bubble can be collapsed to become two pieces for a trash bag.

The invention includes a method of forming a polymer substrate upon melt processing. The method includes providing a first master batch of activated carbon particles wherein the particles are at least partially encapsulated with a non-water soluble amorphous polymer.

Particularly, and in accordance with a preferred embodiment of the present invention, the first master batch is formed by compounding a non-water soluble amorphous polymer in pellet form with activated carbon.

Activated carbon generally is recognized as carbon material mostly derived from charcoal that has a high surface area. Before processing, activated carbon has a high porosity, which allows for a large amount of void space within the particles that gives good absorption. It is preferred that the activated carbon be any type that is in fine powder format. For bag applications, the particle size is preferably less than 10 μm, more preferably less than 7 μm, and most preferably less than 5 μm. For other applications, the particle size can be larger. The activated carbon powder should have a narrow particle size distribution. The activated carbon particles are non-modified activated carbon particles, although modified activated carbon particles or other odor absorbing powders that are porous can be used.

The non-water soluble amorphous polymer is used to encapsulate and protect the activated carbon during the melt processing. For the purpose of illustration, and not limitation, reference is made to the embodiment of FIG. 1, which shows an encapsulated activated carbon particle 100. The core activated carbon particle 110 is at least partially surrounded by the non-water soluble amorphous polymer encapsulant 120.

In a preferred embodiment the non-water soluble amorphous polymer is a rigid, permeable polymer. Preferably, the non-water soluble amorphous polymer is a brittle composition that can be cracked such as mechanically or thermally by induced stress. A preferred non-water soluble amorphous polymer is incompatible with the product matrix material as described further below. For example, in a preferred embodiment, the matrix polymer is linear low density polyethylene ("LLDPE"), and the non-water soluble amorphous polymer is polystyrene. Other suitable non-water soluble polymers include other styrenic polymers and copolymers such as styrene-acrylonitrile copolymers, styrene-containing elastomers such as styrene isoprene styrene ("SIS"), styrene butadiene styrene ("SBS"), styrene ethylene butalene ("SEBS"), silicon-based elastomers, olefin-based elastomers such as ethylene methyl acrylate ("EMA"), ethylene vinyl acetate ("EVA"), styrene-butadiene copolymers of KRO3, cyclic polyolefins, permeable or water sensitive materials such as thermoplastic polyurethane ("TPU"), brittle materials such as polymethyl mathacralate ("PMMA"), acrylics, polyethyelene terephalate ("PET"), polyamides, cellulosics such as cellulosic acetate and derivatives, non-water soluble surfactants, amorphous wax, and any combination thereof.

In an alternative embodiment, porosity-inducing formulations such as polymers dissolved in a solvent can be used as a coating material on the activated carbon. The solvent can be phase-separated out to form a porous network in the coating, a method or formation similar to microporous membrane formation. Other suitable materials used include ionomers, epoxy compounds, crosslinkable resins, and other suitable materials.

The activated carbon is encapsulated by compounding, coating, plasma deposition, ionic deposition, physical deposition, chemical deposition, or any other suitable process. In a preferred embodiment the activated carbon is encapsulated by compounding the polymer with the activated carbon. Compounding is recognized generally as combining polymers and/or other materials by blending, for example by using an extruder. In an alternate embodiment, the activated carbon is encapsulated by coating by dissolving in a solvent as described in more detail herein below.

Optionally, surface treatment can be performed for adding polarity or branched polymers on the surface of the encapsulated activated carbon particles. Such treatments include stearic acid treatment, silane coupling agent treatment, and any other known treating formulation or techniques to affect the surface characteristics of activated carbon such that desired characteristics can be achieved. These techniques allow the activated carbon to bind other particles better, such as $CaCO_3$, and create gaps which gives better absorption characteristics and stronger affinity to stay with other particles.

Further, in accordance with the invention, the method comprises providing a matrix polymer, mixing the first master batch with the matrix polymer to form a mixture, and extruding the mixture to form a polymer substrate. As previously noted, the matrix polymer can be, and preferably is, linear low density polyethylene. Alternative polymers suitable for the desired product or application can be used. Non-limiting examples of suitable matrix polymers include polymers, copolymers or blends of: low density polyethylene (LDPE), linear low density polyethylene (LLDPE), linear medium-density polyethylene (LMDPE), high density polyethylene (HDPE), very low density polyethylene (VLDPE), metallocene (mPE), polypropylene (PP), polyamide 6 polyamide 66 and their copolyamide, poly vinyl chloride (PVC), acrylic, thermoplastic polyester (TPE), ethylene/vinyl acetate (EVA), polystyrene (PS), high impact polystyrene (HIPS), modified polystyrene, liquid crystal polymer (LCP), polyamides, polyacrylic acid (PAA), polylactic acid (PLA), polyethylene terephthalate glycol (PETG), polymethyl methacrylate (PMMA), polyphenylene ether (PPE), thermoplastic elastomer, and cellulose and filled plastics.

To facilitate mixing or compounding, the matrix polymer preferably is provided in the form of pellets or other well known form for melt processing. Mixing of the first master batch with the matrix polymer to from a mixture, and extruding the mixture to form a substrate can be performed by any of a number of known techniques using conventional equipment. For example the encapsulated carbon particles can be blended with the pellets of matrix polymer at the desired ratio and then heated to a molten state prior to extrusion. Alternatively, the matrix polymer can be heated first to a molten state prior to mixing the desired ratio of encapsulated particles therein.

In one embodiment, the activated carbon is compounded with the non-soluble amorphous polymer by using conventional master batch processing techniques, such as using mechanical, thermal, or extrusion tools such as a high intensity mixer, Koch mixer, mechanical mixers, or ribboners. Requirements such as pre-drying or surface pretreatment for dispersion of fine particles may optionally be used. Similar techniques can be used for compounding the encapsulated activated carbon with the matrix polymer.

If desired, the activated carbon can mixed with additional ingredients or additives such as calcium carbonate ($CaCO_3$), magnesium hydroxide ($Mg(OH)_2$), talc, or other suitable additives, for processing together. These additives serve as pore formers and help create microvoids which assist in creating a path for malodors which increases absorption. Other odor absorbing additives include, but are not limited to, zeolites, cyclodextrins, baking soda, clays, silica gels, naturally formed inorganic particles and minerals (e.g., dirt) and other known suitable odor absorbing additives. One of ordinary skill in the art will select odor additives of different shapes and material parameters to be compounded with activated carbon in any weight ratios to achieve desired performance targets such as rigidity and surface characteristics. In a preferred embodiment, the additive is mixed with the activated carbon and non-soluble amorphous polymer in forming the master batch. Alternatively, the additive could be mixed with the polymer matrix during the product formation stage.

In one embodiment, an optional step includes crazing or cracking the encapsulant, or creating microvoids or cavitations in the matrix polymer around the activated carbon particles, each of which can be created by a variety of mechanical or thermal techniques. Examples of mechanical techniques for include, but are not limited to, mechanical or local stretching, rolling, or any other suitable means for creating voids. Examples of thermal techniques include quenching or quickly cooling, for example by using an ice bath or chiller, thermal shocking, or any other suitable means for shrinking the polymer on a submicron scale. These various structures create a path for the malodors to reach the activated carbon, which increases the amount absorption and odor reduction. Such crazing or cracking can be created prior to mixing the first master batch with a matrix polymer or after such mixing occurs. Creating microvoids and cavitations will occur during or after extrusion.

In accordance with another aspect of the invention, a polymer substrate also is provided. The polymer substrate comprises a matrix polymer substrate material, activated carbon particles, and a non-water soluble amorphous polymer which at least partially encapsulates the activated carbon particles.

The activated carbon, non-water soluble amorphous polymer, and matrix polymer that form the polymer substrate in accordance with the invention are described in detail above, respectively. Likewise, these components can be present in any suitable weight percent and/or can include any of the other features described herein. The activated carbon particles preferably are non-modified activated carbon particles.

Figure 2:
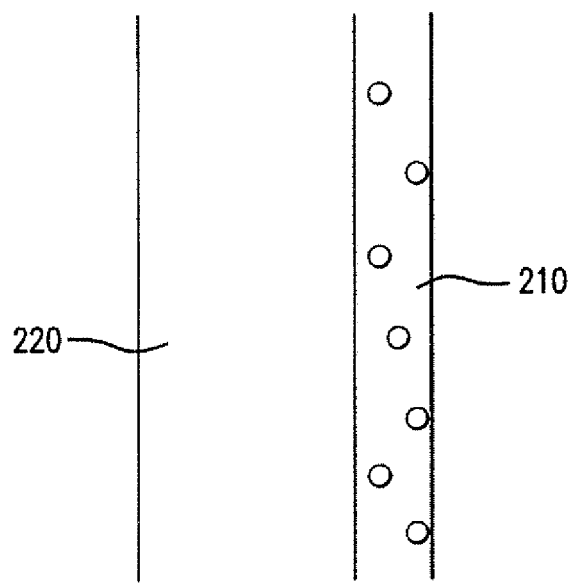
FIG. 2 is a representation of one embodiment of a multi-layered film in accordance with the invention.
Figure 3:
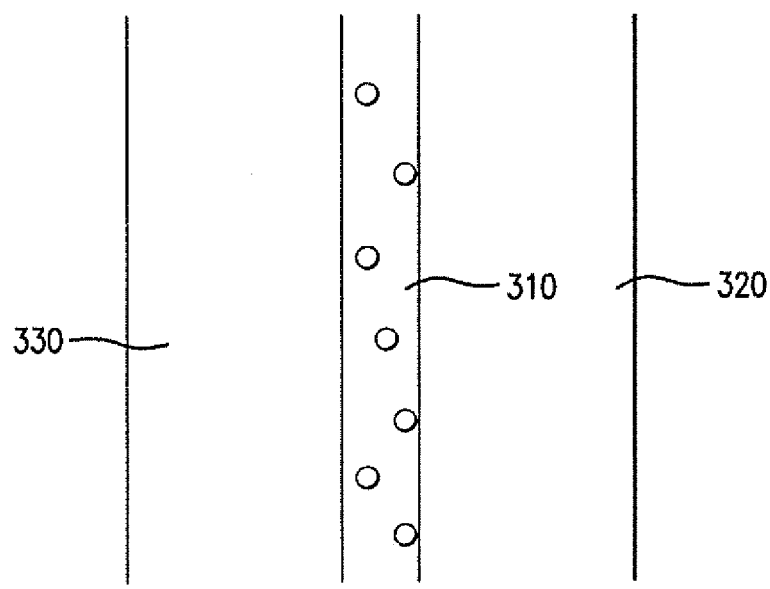
FIG. 3 is a representation of another embodiment of a multi-layered film in accordance with the invention.
Figure 4:
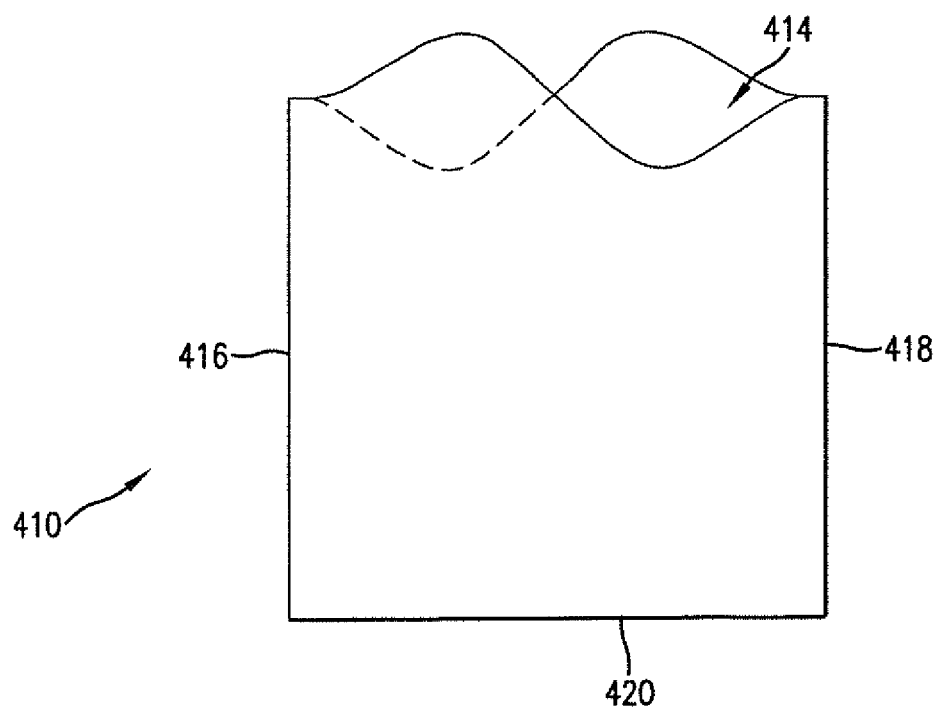
FIG. 4 is a representation a bag formed from a film made in accordance with the invention.

In one preferred embodiment, as depicted in FIGS. 2 and 3, the polymer substrate is a film structure having a suitable thickness for the intended application, such as a thickness between 0.5 and 10 mils for bags and wraps. The polymer substrate can be a single layer, or a multi-layered structure if desired. The invention also includes an article made from the polymer substrate, including, but not limited to a web, film, sheet, wrap, bag container, or the like. In a preferred embodiment, the article is a bag 410 having a pair of panels joined along opposing sides 416, 418 and a bottom 420 opposite an open mouth 414, as shown in FIG. 4. The bag can have any size and configuration suitable for its purpose.

For example, in one embodiment, the bag can have a single layer construction. For such single layer construction, small particle size activated carbon should be used to maintain the integrity of the panels of the bag. In a preferred embodiment, for purpose of example and not limitation, the activated carbon has an average particle size of 6 µm or smaller, with the thickness of the film is approximately 1 mil. The bag can be made by conventional blown or extrusion processes or other known suitable techniques.

In another embodiment, the article, such as a web, film, or bag panel, can have a multi-layer construction. For example, each panel of the bag includes two or more layers with the encapsulated activated carbon distributed uniformly in the inside layer of the bag. This structure allows a short diffusion path for the odor molecules to reach the activated carbon particles that are distributed near the surface of the film. The outer layer can be free of activated carbon, and if desired, can be a barrier layer made of suitable materials to prevent or inhibit the transfer of gases or malodors.

For the purpose of illustration, and not limitation, reference is made to the embodiment of FIG. 2, which shows an example of a multilayer construction. The first layer 210 includes the encapsulated activated carbon and a polymer formulation, such as linear low density polyethylene. The first layer can optionally include any of the additives discussed herein above. The second layer 220 is a solid polymer layer, such as linear low density polyethylene. In one embodiment, the first layer is located on the inside of a bag. In a preferred embodiment, the relative thickness ratio of the first to second layer ranges from 1/99 to 99/1. The multilayer bag can be formed by coextruding, extrusion coating, spray coating, printing, or patterning, or any other known suitable techniques. Further, the processing method optionally includes any of the mechanical or thermal means of crazing, cracking or creating microvoids or cavitations around the activated carbon particles discussed herein.

For the purpose of illustration, and not limitation, reference is made to the embodiment of FIG. 3, which shows another example of an alternate polymer substrate having a multilayer construction. The first layer 310 includes the encapsulated activated carbon and a polymer formulation, such as linear low density polyethylene. The first layer 310 can optionally include any of the additives discussed herein above. The first layer is sandwiched between the second layer 320 and the third layer 330. In a preferred embodiment, the second layer 320 is a porous, permeable or breathable layer. The second layer 320 can also optionally include any of the additives discussed herein above. The third layer 330 is a solid polymer layer, such as linear low density polyethylene. Preferably, the third layer 330 is a barrier layer to prevent odor leakage. In one embodiment, the second layer is disposed on the inside of a bag or container such that the odors can reach the first layer by traveling through the second layer. The multilayer polymer substrate can be made by lamination, coextrusion, or any other known suitable techniques.

In any of the embodiments of the multi-layer application, the construction optionally includes a barrier layer (e.g. gas barrier) and/or an adhesive layer with a release liner. The number and thickness of layers can vary depending on the requirements of mechanical properties and the odor efficacy performance desired. Other features of a bag that can be formed with the polymer substrate and method of the invention are described in copending U.S. application Ser. No. 11/430,307 entitled "Web Materials With Active Agent For Use In Forming Reclosable Packages," which is incorporated herein in its entirety and U.S. application Ser. No. 10/375,188 entitled "Thermoplastic Bags Or Liners And Methods Of Making The Same," which is also incorporated herein in its entirety.

In one embodiment, the bag has the following performance characteristics: the machine direction draw ratio is substantially between 15 and 86; the transverse direction draw ratio is between 1.5 and 4; the area draw ratio is between 60 and 129; the die wall shear rate is between 10 and 200 per sec; and the loading of activated carbon is substantially between 1 and 50 wt %.

Further in accordance with the invention, a master batch is provided for use in melt processing with a matrix polymer to prepare a polymer substrate. The master batch comprises activated carbon particles and a non-water soluble amorphous polymer which at least partially encapsulates the activated carbon particles.

Materials and details of the activated carbon and non-water soluble amorphous polymer are described previously herein. Additionally these components can be present in any weight percent and/or can include any of the other features described herein.

Having broadly described the invention and preferred embodiments thereof herein above, the following examples help demonstrate the invention. These examples, however, are presented for purposes of illustration and should not be construed as limiting the invention.

EXAMPLE 1

Encapsulation of Activated Carbon with Polystyrene

Polystyrene ("PS") resins were used for encapsulation of activated carbon ("AC"). The PS resins included STYRON 685 (Dow Chemical, melt index ("MI")=1.5 gram/10 mins) and Polystyrene 523 (TOTAL Petrochemicals, MI=11). Materials in pellet form were compounded with a commercially available AC powders (6-10 μm) with a 50/50 weight ratio in a Brabender mixer operated at 200° C. for 5 minutes. The blends were collected and then compounded with LLDPE (Dow Chemical, MI=0.9) in the Brabender to make a 10/90 ratio blend that gave a composition ratio of AC/PS/LLDPE=5/5/90 in the blend. AC without encapsulation of PS was compounded with the same LLDPE resin to form a AC/LLDPE=5/95 composition ratio blend as a control for comparison.

Film samples, approximately 3 mils thick, were molded at 200° C. from a molding press and evaluated for odor absorption efficacy by using ethyl acetate ("ETAC") vapor as the odor molecule. The odor absorption efficacy was determined by putting samples in glass jars containing fixed amount of ETAC and measuring the weight of the samples in 1 to 24 hours storage time periods. The amount of ETAC used was 10 μl (9.6 mg) in a 125 cc bottle that contained approximately 0.25 grams of the film sample. The odor absorption capability was determined by how much and how quickly ethyl acetate was absorbed in the films. The absorption results are listed in Table 1, expressed as the weight gain ratio with respect to the weight of AC. The films of PS encapsulated AC showed much higher total absorption and a faster absorption rate than the control.

EXAMPLE 2

Encapsulation of Activated Carbon with TOPAS Cyclic Olefin Copolymer

Cyclic olefin copolymers produced by TOPAS Advanced Polymers were used for encapsulation of AC. The TOPAS cyclic olefin materials are amorphous and known to have higher rigidity than conventional polyolefins. TOPAS 6013 and 5013 were compounded with activated carbon, in the same manner as described above in Example 1, with a 50/50 weight ratio in a Brabender mixer operated at 200° C. for 5 min. The blends were then compounded with LLDPE in the Brabender to make a 10/90 weight ratio blend. The blend had a composition ratio of AC/Topas/LLDPE=5/5/90. The TOPAS encapsulated AC samples showed higher total absorption and a faster absorption rate compared with the control as shown in Table 1.

EXAMPLE 3

Encapsulation of Activated Carbon with Polystyrene Copolymers

A styrene-butadiene copolymer of KRO3 (Chevron Phillips) and a SEBS resin of Kraton G2720 were used in encapsulation of AC. The resins were processed using the same method and process as described in Example 1 above to make blends with AC and LLDPE with composition ratios of AC/KRO3/LLDPE=5/5/90 and AC/SEBS/LLDPE=5/5/90. The odor efficacy was evaluated by using the same method as described in Example 1 above. Films made of the encapsulated formulations showed higher absorption and a faster absorption rate than the control group, as shown in Table 1.

EXAMPLE 4

Encapsulation of Activated Carbon with Low Crystallinity Elastomers

Vistamaxx 3000 and 6100 (ExxonMobil) are polyolefin elastomers that have a relatively low degree of crystallinity (<30%) compared with conventional polyolefin resins. Vistamaxx 3000 and 6100 resins were compounded with activated carbon, in the same manner as described in Example 1 above, in a 50/50 ratio in a Brabender at the same condition described in Example 1. The blends were then compounded with LLDPE to make 10/90 ratio blends. A final composition ratio of AC/Vistamaxx/LLDPE=5/5/90 was made. The odor efficacy was evaluated by using the same method as described in Example 1. Films made of the encapsulated formulations showed marginally higher absorption and a faster absorption rate than the control, as shown in Table 1. The low crystallinity elastomers tested in this example were not as effective as the other encapsulants described in Example 1-3 above. The crystallinity of the polymers useful for encapsulation is preferably less than 30%, more preferably less than 15%, and most preferably less than 5%.

TABLE 1

Summary of odor absorption data for films from Brabender blends

| | | Ethyl acetate absorption, wt % | | | |
|---|---|---|---|---|---|
| Example | Sample description | 1 hr | 2 hrs | 4 hrs | 24 hrs |
| Control | LLDPE blank | 0 | 0 | 0 | 0 |
| Control | 5/95 AC/LLDPE | 5 | 7 | 10 | 16 |
| 1 | 5/5/90 AC/PS685/LLDPE | 15 | 20 | 27 | 37 |
| 1 | 5/5/90 AC/PS523/LLDPE | 13 | 19 | 28 | 32 |
| 2 | 5/5/90 AC/Topas5013/LLDPE | 6 | 10 | 14 | 29 |
| 2 | 5/5/90 AC/Topas6013/LLDPE | 7 | 10 | 16 | 29 |
| 3 | 5/5/90 AC/KRO3/LLDPE | 12 | 16 | 19 | 30 |
| 3 | 5/5/90 AC/KratonG2720/LLDPE | 21 | 26 | 26 | 25 |
| 4 | 5/5/90 AC/Vistamaxx3000/LLDPE | 11 | 13 | 15 | 18 |
| 4 | 5/5/90 AC/Vistamaxx6100/LLDPE | 10 | 12 | 16 | 19 |

EXAMPLE 5

Extruded Films with Encapsulated Activated Carbon

Polystyrene resins of STYRON 685 (Dow Chemical, MI=1.5) and General Purpose Crystal Polystyrene 3900 (Nova Chemical, MI=38) were used to make 50/50 PS/AC compounds from a high intensity Henschel mixer at approximately 200° C. The blends were used in blown film extrusion with LLDPE resin to make 1.5 mil films. The net material formulation was a 5/5/90 ratio of AC/PS/LLDPE in the films. Film extrusion was performed on a 1" single screw Killion extruder with a 3" annular die to make 8" layflat blown films. The extrusion and die temperatures were set at 200° C. Films were collected in rolls by using a winder. The films were tested for odor efficacy by using the same method as described in the previous examples. The film sample weight was adjusted to contain an equivalent AC weight to the molded films to be used in the test jars and a similar amount of ETAC was used in the test. The result is shown in Table-2. The result showed that films contained PS encapsulated AC gave a much higher absorption rate, and the total absorption of ethyl acetate was also higher.

TABLE 2

The odor absorption data of blown films

| | | Ethyl acetate absorption, wt % | | | |
|---|---|---|---|---|---|
| Example | Sample description | 1 hr | 2 hrs | 4 hrs | 24 hrs |
| Control | 5/95 AC/LLDPE | 2 | 2 | 5 | 13 |
| 5 | 5/5/90 AC/PS685/LLDPE | 15 | 19 | 27 | 30 |
| 5 | 5/5/90 AC/PS3900/LLDPE | 12 | 16 | 24 | 26 |

EXAMPLE 6

Coextruded Films with Encapsulated Activated Carbon

General Purpose Crystal Polystyrene 3900 (Nova Chemical, MI=38) was used to make 50/50 PS/AC compounds from a high intensity Henschel mixer with activated carbon (6-10 µm) in the same manner as described in Example 5. The compounds were dried in vacuum oven for 24 hours prior to the extrusion processing. A commercial $CaCO_3$/LDPE=50/50 masterbatch in pellet form was also used for selected samples. The LLDPE resin was from Dow Chemical (MI=0.9). Two-layer coextruded blown films were produced from a blown film line that has two 1" extruders and a feedblock to allow the two melt streams to feed to a 2" annular die. Films were blown from the die with a layflat of approximately 6" and a thickness of 1.5 mils. The films consisted of two layers with an inside/outside layer ratio of 20/80. The outside layer was LLDPE and the inside layer contained 2% net AC, with and without encapsulation, blended with LLDPE. The extrusion was conducted at approximately 200° C. extrusion and die temperatures with an extrusion rate of approximately 15 lbs/hr. Films were collected on rolls by using a winder.

The odor absorption efficacy of the films was tested by using the same method as described in Example 1. The results are summarized in Table 3. The absorption capability of AC could vary with its dispersion status and residual moisture content. In this set of blown film samples, the control sample had 7% absorption, the sample with PS3900 encapsulation had 17% absorption, and the sample with PS3900 encapsulation and with the addition of $CaCO_3$ had 31% absorption after 24 hrs of storage. Films with encapsulated AC clearly performed better than the non-encapsulated control.

TABLE 3

Odor absorption of coextruded films

| | Ethyl acetate absorption, wt % | | | |
|---|---|---|---|---|
| Sample description | 1 hr | 2 hrs | 4 hrs | 24 hrs |
| 80/20 outside/inside layer ratio<br>outside = LLDPE<br>inside = 10/90 AC/LLDPE<br>Net composition AC/LLDPE = 2/98 | 2 | 5 | 4 | 7 |
| 80/20 outside/inside layer ratio<br>outside = LLDPE<br>inside = 10/10/80 AC/PS/LLDPE<br>Net composition AC/PS/LLDPE = 2/2/96 | 9 | 17 | 16 | 17 |
| 80/20 outside/inside layer ratio,<br>outside = LLDPE<br>inside = 10/10/40/40 AC/PS/$CaCO_3$/LDPE<br>Net composition AC/PS3900/$CaCO_3$/LDPE/LLDPE = 2/2/8/8/80 | 22 | 29 | 32 | 31 |

EXAMPLE 7

Coextruded Films and Bags Containing Encapsulated Activated Carbon

Activated carbon was processed with a chosen polystyrene resin to make encapsulated compounds and to make 2-layer coextruded films for a bag odor absorption test. The activated carbon used in the test was a powder grade material with a mean particle size <4 µm. The AC powder was compounded with Polystyrene 523 (TOTAL Petrochemicals) in a twin screw extruder to make a 50/50 weight ratio compound. In some examples, a small amount of $CaCO_3$ was added to the AC powder and Polystyrene 523 and compounded in the extruder. The granulated compounds were dried in a hot air oven at 80° C. for 24 hours and then dried in a vacuum oven at 80° C. for at least 1 hour. The dried compounds were subsequently used for 2-layer blown film coextrusion.

The coextrusion line has a 2" and 1.75" extruder connected to a blown film die that allows two melt streams to be combined in a feedblock and coextruded in a 6" annular die. The extrusion and die temperature were set in approximately the 200-230° C. range. The total extrusion rate was approximately 150 lbs/hr. The layer thickness ratio in the film was adjusted by controlling the feed rate to result in 10/90 and 20/80 inside/outside ratios with LLDPE as the outside layer and LLDPE with the encapsulated AC as the inside layer. The blown film had a layflat of approximately 32" and the film thickness was approximately 1 mil. Films were collected on rolls by a winder.

Bags of approximately 27" by 24" with one of the 24" sides as the opening were made for the odor efficacy test. The bags were stored in metal cans that allowed the bags to open on the top and the films to be conformed to the can interior surface. The cans were closed with a metal top cover. Food mixtures containing milk, chicken, onion, broccoli and cantaloupe were prepared by using a kitchen blender. A fixed amount of the food mixture was stored in each of the bags for 96 hours. The volatile content inside the bags were measured by sampling the headspace vapor in the bag and analyzing it using gas chromatography ("GC"). The total evolution of the volatile content was measured and compared. The results are shown in Table 4 and indicate that the formulation with 2% net encapsulated AC allowed reduction of >50% of the headspace odor contents. The additional use of $CaCO_3$ in conjunction with AC in the inside layer of the film provided lower volatile content in the bag.

TABLE 4

Comparison of the volatile content (number of odor molecules counted) in the bag headspace

| Sample description | Total volatile content, GC counts, arb units |
|---|---|
| Bag without activated carbon | 1.1E(+8) |
| 80/20 outside/inside layer ratio<br>Inside = 10/10/80 AC/PS/LLDPE<br>Outside = LLDPE<br>Net composition AC/PS/LLDPE = 2/2/96 | 5.5E(+7) |
| 80/20 outside/inside layer ratio<br>inside = 10/10/20/60 AC/CaCO₃/PS/LLDPE<br>outside = LLDPE<br>Net composition AC/CaCO₃/PS/LLDPE = 2/2/4/92 | 4.1E(+7) |

EXAMPLE 8

Mixture of Activated Carbon with Stearic Acid Treated $CaCO_3$

A control sample was prepared by mixing stearic acid treated $CaCO_3$ with activated carbon, then compounding this blend into the LLDPE matrix. A 50/50 mixture of activated carbon and $CaCO_3$ powder was prepared and heated to 150° C. for 1 hour. A small amount of the mixture was used to make blends with LLDPE and film samples as described above in Example 1. The results showed that the 5/5/90 ratio of activated carbon/$CaCO_3$/LLDPE performed somewhat better than the 5/95 control blends of activated carbon/LLDPE. The $CaCO_3$ did contribute to the AC efficacy, but not nearly to the extent as when polystyrene was used as an encapsulant.

EXAMPLE 9

Coating of Polystyrene on Activated Carbon

As an alternative to melt compounding, coating is another way to apply encapsulation of amorphous polymers such as polystyrene ("PS"). Polysytrene was chosen to use as a coating or encapsulation material due to its permeable nature, brittleness and incompatibility with the film matrix material of LLDPE. Work was done in a lab to demonstrate the concept. In one preparation, 20 grams of activated carbon (6-10 µm) was dispersed in methylene chloride. 1 gram of polystyrene was dissolved in 10 ml methylene chloride to from a uniform solution. The polystyrene solution was mixed with the activated carbon/methylene chloride mixture. The methylene chloride (solvent) was allowed to evaporate to form 5% polystyrene-coated activated carbon. The material was dried at 90° C. for approximately 16 hours. The dried material was ground with a mortar and pestle. The material was used for blending with LLDPE to form films in a Brabender. Film samples were pressed and tested for odor absorption efficacy by using tetra hydrofuran ("THF") and ethyl acetate ("ETAC") as the odor molecules. Measurements were taken for samples enclosed in glass jars containing fixed amount of the odor compounds and stored for 2 or 4 hours. The amount of the odor compound remaining in the jar was measured by using gas chromatography ("GC"). Various types of samples were tested using the same method as a comparison. The results show that films with 5% polystyrene-coated activated carbon possessed higher odor-absorbing capability than that of the non-coated activated carbon in the same 5% activated carbon loading. The absorption was conducted for 2 and 6 hrs storage time by following the same odor efficacy test method. Films with PS-coated AC showed higher absorption and faster absorption rate than the un-coated control which was basically flat from 2 to 6 hrs of storage, as shown in Table 5.

TABLE 5

ETAC absorption of films containing PS-coated AC

| | Ethyl acetate absorption, wt % | |
|---|---|---|
| Sample description | 2 hrs | 6 hrs |
| 5/95 AC/LLDPE | 3 | 2 |
| 4.75/0.25/95 AC/PS/LLDPE | 8 | 22 |

While the present invention is described herein in terms of certain preferred embodiments, those skilled in the art will recognize that various modifications and improvements may be made to the invention without departing from the scope thereof. Moreover, although individual features of one embodiment of the invention may be discussed herein or shown in the drawings of one embodiment and not in other embodiments, it should be apparent that individual features of one embodiment may be combined with one or more features of another embodiment or features from a plurality of embodiments.

In addition to the specific embodiments claimed below, the invention is also directed to other embodiments having any other possible combination of the dependent features claimed below and those disclosed above. As such, the particular features presented in the dependent claims and disclosed above can be combined with each other in other manners within the scope of the invention such that the invention should be recognized as also specifically directed to other embodiments having any other possible combinations. Thus, the foregoing description of specific embodiments of the invention has been presented for purposes of illustration and description. It is not intended to be exhaustive or to limit the invention to those embodiments disclosed.

It will be apparent to those skilled in the art that various modifications and variations can be made in the method and compositions of the present invention without departing from the spirit or scope of the invention. Thus, it is intended that the present invention include modifications and variations that are within the scope of the appended claims and their equivalents.

The invention claimed is:

1. A polymer article having odor absorption capabilities comprising:
   a film comprising a matrix polymer of linear low density polyethylene and activated carbon particles at least partially encapsulated with a non-water soluble amorphous polymer,
   wherein the non-water soluble amorphous polymer is selected from the group consisting of polystyrene, cyclic olefin copolymer, styrene-butadiene copolymer, and styrene ethylene butalene styrene (SEBS).

2. The polymer article of claim 1, wherein the non-water soluble amorphous polymer is polystyrene.

3. The polymer article of claim 1, wherein the non-water soluble amorphous polymer is a cyclic olefin copolymer.

4. The polymer article of claim 1, wherein the activated carbon particles are non-modified activated carbon particles.

5. The polymer article of claim 1, wherein the loading of activated carbon is substantially between 0.1 and 50 wt %.

6. The polymer article of claim 1, wherein the matrix polymer comprises microvoids or cavitations around the activated carbon particles.

7. The polymer article of claim 1, wherein the film further comprises at least one additive.

8. The polymer article of claim 7, wherein the additive is $CaCO_3$.

9. The polymer article of claim 1, wherein the thickness of the film is between 0.5 and 10 mils.

10. The polymer article of claim 1, wherein the film is a single layer structure.

11. The polymer article of claim 10, wherein the activated carbon particles have a particle size less than about 6 μm.

12. The polymer article of claim 1, wherein the film is a multi-layer structure.

13. The polymer article of claim 12, wherein a first layer of the multi-layer structure includes the activated carbon particles and a second layer of the multi-layer structure is a barrier layer.

14. The polymer article of claim 1, wherein the film is a coextruded structure.

15. The polymer article of claim 1, wherein the article is a bag comprising first and second body panels joined along a pair of opposing sides and a closed bottom extending between said sides to define an open mouth, at least one of the first and second body panels formed of the film.

16. A polymer article having odor absorption capabilities comprising:
    a film comprising a matrix polymer of linear low density polyethylene and activated carbon particles at least partially encapsulated with a non-water soluble amorphous polymer,
    wherein the non-water soluble amorphous polymer is selected from the group consisting of polystyrene, cyclic olefin copolymer, styrene-butadiene copolymer, and styrene ethylene butalene styrene (SEBS) and the non-water soluble amorphous polymer is cracked or crazed.

17. The polymer article of claim 16, wherein the article is a bag comprising first and second body panels joined along a pair of opposing sides and a closed bottom extending between said sides to define an open mouth, at least one of the first and second body panels formed of the film.

18. A polymer bag having odor absorption capabilities comprising:
    first and second body panels joined along a pair of opposing sides and a closed bottom extending between said sides to define an open mouth,
    the first and second body panels comprising a matrix polymer of liner low density polyethylene and activated carbon particles at least partially encapsulated with a non-water soluble amorphous polymer,
    wherein the non-water soluble amorphous polymer is selected from the group consisting of polystyrene, cyclic olefin copolymer, styrene-butadiene copolymer, and styrene ethylene butalene styrene (SEBS) and the non-water soluble amorphous polymer is cracked or crazed.

19. The polymer bag of claim 18, wherein the matrix polymer comprises microvoids or cavitations around the activated carbon particles.

20. The polymer article of claim 1, wherein the polymer article has an ethyl acetate absorption of at least 14 weight percent when 0.25 grams of the polymer article is placed in a 125 cc bottle containing 9.6 mg of ethyl acetate after 4 hours.

21. The polymer article of claim 16, wherein the polymer article has an ethyl acetate absorption of at least 14 weight percent when 0.25 grams of the polymer article is placed in a 125 cc bottle containing 9.6 mg of ethyl acetate after 4 hours.

22. The polymer bag of claim 18, wherein the polymer bag has an ethyl acetate absorption of at least 14 weight percent when 0.25 grams of the polymer bag is placed in a 125 cc bottle containing 9.6 mg of ethyl acetate after 4 hours.

* * * * *